United States Patent [19]

Mast et al.

[11] 4,220,019
[45] Sep. 2, 1980

[54] SHEAR CLUTCH ASSEMBLY WITH REVERSE DRIVE MECHANISM FOR CLEARING OVERLOADS

[75] Inventors: James W. Mast; Virgil B. Martin, both of West Bend; Roger L. Villers, Fredonia, all of Wis.

[73] Assignee: Gehl Company, West Bend, Wis.

[21] Appl. No.: 4,295

[22] Filed: Jan. 18, 1979

[51] Int. Cl.³ .................... F16D 3/56; F16D 7/00
[52] U.S. Cl. ............................. 64/28 R; 64/29
[58] Field of Search ........................ 64/28 R, 29, 30

[56] References Cited

U.S. PATENT DOCUMENTS

| | | | |
|---|---|---|---|
| 2,659,469 | 11/1953 | Unk | 64/28 R |
| 2,847,836 | 8/1958 | Morris | 64/28 R X |
| 2,855,768 | 10/1958 | Plano | 64/28 R |
| 2,962,880 | 12/1960 | May | 64/28 R |
| 3,000,577 | 9/1961 | Ferguson | 64/28 R X |
| 3,487,902 | 1/1970 | Persson | 64/28 R X |

*Primary Examiner*—Henry K. Artis
*Attorney, Agent, or Firm*—James E. Nilles

[57] ABSTRACT

A shear clutch assembly for a rotatably driven power transmitting shaft and including a shear bolt which is sheared and causes a disconnect in the driving parts for the shaft. The assembly includes a flange rigidly fixed to the shaft and a rotatably driven member, for example, such as a sprocket rotatably mounted on the shaft and connected to the flange by the shear bolt. A reversing drive mechanism is carried by the driver or the driven member and when the power is transmitted in the normal or forward direction, the reversible drive connection is ineffective. However, when the shear bolt means has been severed and dislodged, power can be reversed and this causes the reverse drive connection to become effective for driving in the reverse direction. In this manner, the power shaft can be easily reversed in its direction to clear the overloaded conditions which caused the shear bolt to fail and to effect the reversal of the power shaft, it is only necessary to reverse the direction of the power to the power driven sprocket.

A machine, such as a harvester or other agricultural implement for example, is provided and which has a pair of cooperating power driven feed rolls for feeding material therethrough and the shear clutch assembly is incorporated in a power driven shaft for said feed rolls.

22 Claims, 9 Drawing Figures

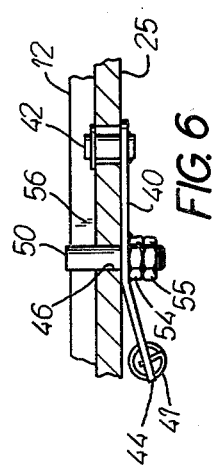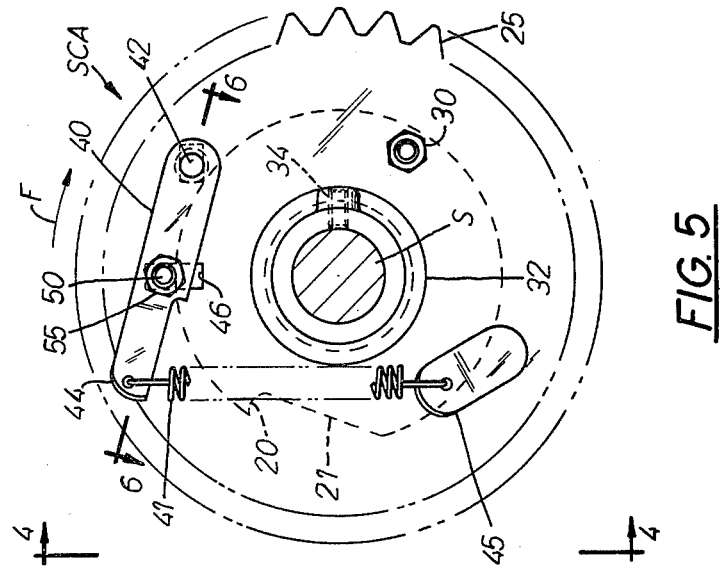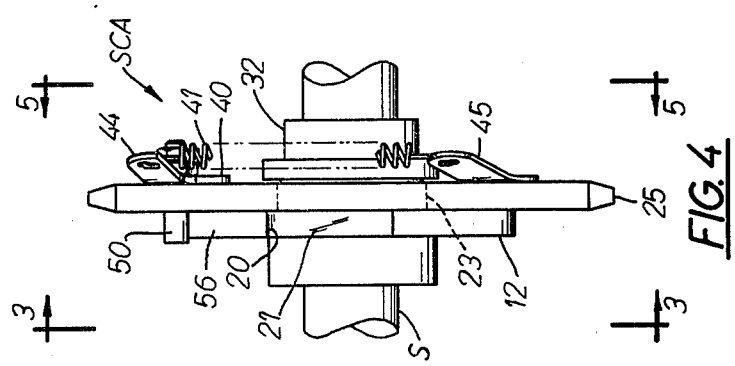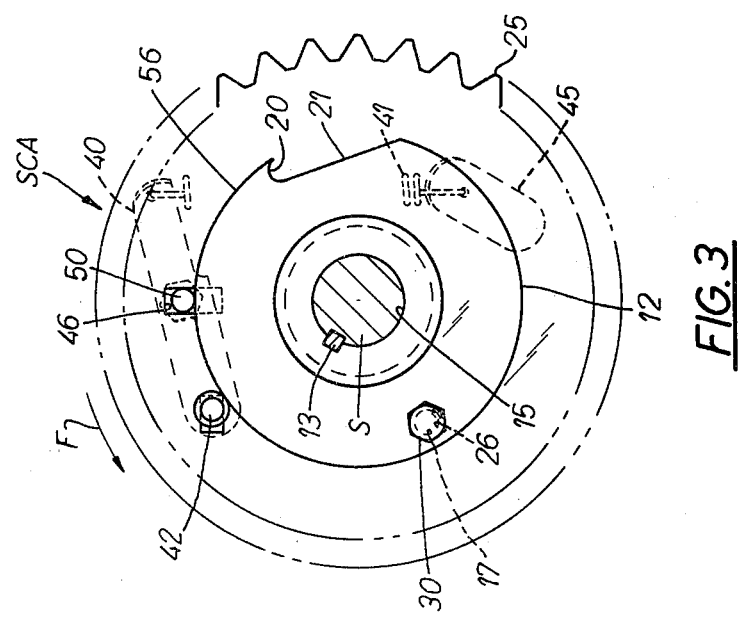

SHEAR CLUTCH ASSEMBLY WITH REVERSE DRIVE MECHANISM FOR CLEARING OVERLOADS

BACKGROUND OF THE INVENTION

Shear clutches have been proposed which include a shear bolt which fails when overload conditions are reached. Conventionally, these shear bolt means require the overload condition to be cleared in one manner or another either by hand or auxiliary reversing equipment and this is laborious and time consuming. When the overload condition has been removed, the parts of the drive mechanism are then aligned so that a new shear bolt, shear pin, or other part that fails can be replaced. These unplugging procedures are quite difficult to accomplish when a severely overloaded condition has occurred.

SUMMARY OF THE PRESENT INVENTION

The present invention provides a shear clutch assembly for a shaft that can be power driven in either a forward normal operating direction or a reversing direction. The assembly includes shear means which fail when an overload condition occurs. The assembly also includes a reverse driven mechanism that automatically becomes operative when the direction of power input to the driven member is reversed. A more specific aspect of the invention relates to a power shaft having one member fixed therewith and extending generally normally to the shaft and also includes a second member journalled on the shaft and the shear means is connected between aligned portions such as holes between the two members. One member is a driven member which carries drive means that automatically drivingly engage the other member when the direction of power to the driven member is reversed.

A more specific aspect of the invention provides a shear clutch assembly of the above type in which the reverse drive means includes a pin that is shiftably mounted on the driven member and when the mechanism is driven in the forward or normal operating direction, the drive pin is inoperative. When the shear means fails, the driving direction of the driven member is then reversed, and the drive pin automatically engages a notch on the periphery of the other member to thereby immediately effect a reversal of directional drive of that other member.

The invention provides a machine having a pair of cooperating power driven feed rolls for feeding material therethrough, and the above shear clutch assembly is incorporated in the power driven shaft for said feed rolls.

These and other objects and advantages of the present invention will appear hereinafter as this disclosure progresses, reference being had to the accompanying drawings.

BRIEF DESCRIPTION OF THE DRAWINGS

FIGS. 3, 4 and 5 are elevational views of the shear clutch assembly shown in FIG. 2, but on enlarged scale, and showing the shear clutch assembly when in the normal operating or forward driving position;

FIG. 3 is a side elevational view of the shear clutch assembly, the view being taken generally from line 3—3 in FIG. 4;

FIG. 4 is a front elevational view of the shear clutch assembly taken generally long the line 4—4 in FIG. 5;

FIG. 5 is a side elevational view of the shear clutch assembly taken generally along the line 5—5 in FIG. 4;

FIG. 6 is a sectional view taken along the line 6—6 in FIG. 5;

DESCRIPTION OF A PREFERRED EMBODIMENT

Figure 1:
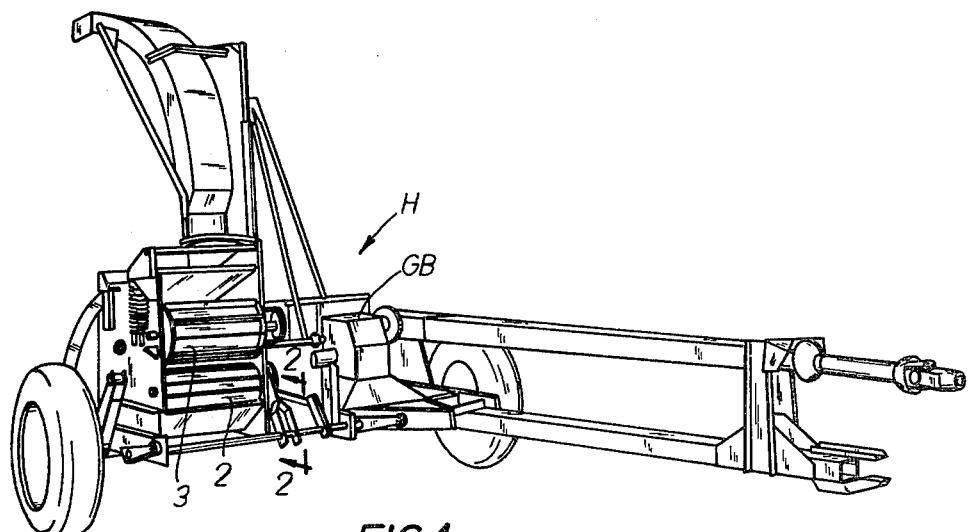
FIG. 1 is a perspective view of a portion of a machine such as a forage harvester on which the present invention has been installed.

The invention has been shown as applied to an agricultural implement, such as part of a forage harvester H shown in FIG. 1 and which has a pair of crop feed rolls 2 and 3 that are journalled for rotation about parallel axes 4 and 5, respectively in the body of the harvester. These feed rolls act in the conventional manner to receive the crop material from a crop gathering portion (not shown) and as the feed rolls rotate in the forward or crop feeding direction as indicated by the curvilinear arrows in FIG. 2, the crop material passes therebetween for feeding to other components in the machine such as a chopping cylinder (not shown), in the conventional manner. When an excessive amount of crop material is engaged between the feed rolls, the latter sometimes are jammed or blocked so that they can no longer be rotatably driven. This overload condition then causes some parts of the drive mechanism to break or malfunction which in turn renders it necessary that the feed rolls be reversed in direction or otherwise cleared of the excessive crop material that causes the overload. While the invention has been shown and described as applied to such a harvester, it should be understood that the invention is equally applicable to other mechanisms in which such overloading occurs to cause malfunction of the machine and require clearing of the overloaded elements before normal operation can be resumed.

The feed rolls 2 and 3 receive their power through suitable roller chains 6 from drive shafts S and S1, respectively, which in turn are driven from a gear box GB and a power source, not shown, through power shaft 5 and roller chain 9.

Suitable universal joints 7 and 8 may be interposed in the drive shafts. The feed rolls are thus driven in synchronism with one another to effect a positive feeding action for the crop material. Only one drive shaft will be described.

Figure 2:
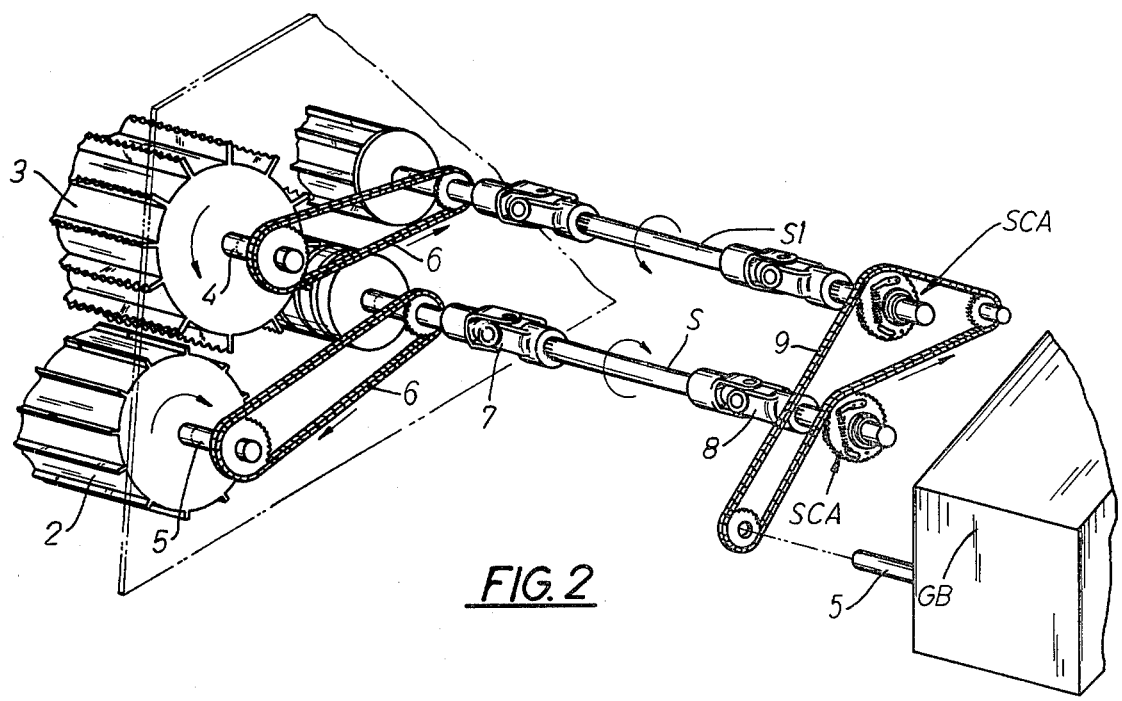
FIG. 2 is a fragmentary, perspective view of a portion of the forage harvester feed rolls shown in FIG. 1 and showing the shear clutch assembly of the present invention as installed on the drive shafts thereof, the view being taken generally from the line 2—2 in FIG. 1.
Figure 9:
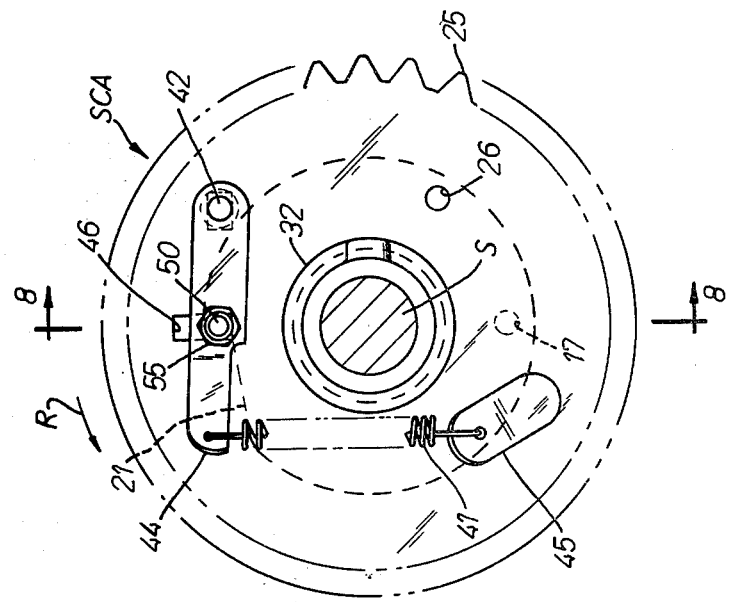
FIGS. 7, 8 and 9 are elevational views of the shear clutch assembly as shown in FIGS. 3, 4 and 5, respectively, but showing the relative position of the parts when rotating in the reverse direction so as to clear the overload from the machine.
Figure 8:
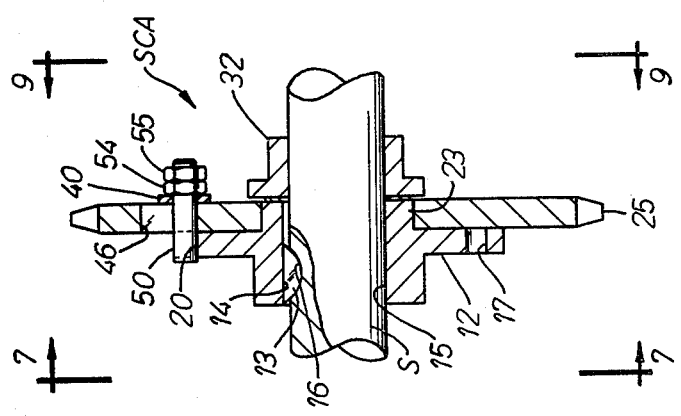
Figure 7:
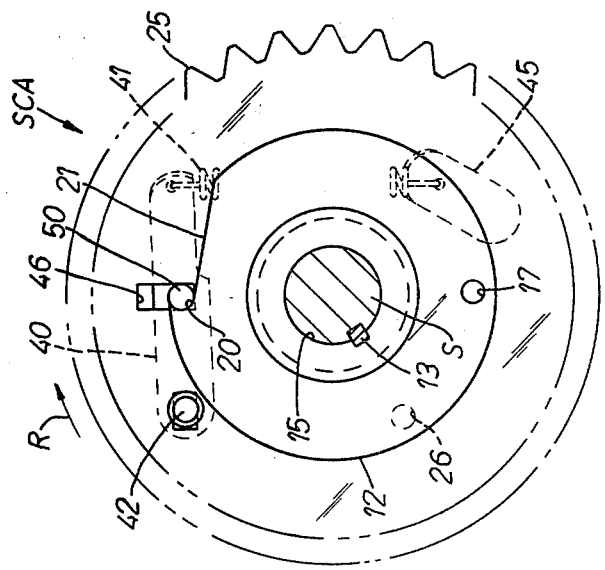

The shear clutch assembly SCA shown in FIG. 2 is shown in greater detail in FIGS. 3 through 9, the views 3 to 5 inclusive showing the shear clutch assembly when driving in the forward or normal operating condition wherein the feed rolls are driven to convey the crop material therebetween. FIGS. 7 to 9 inclusive show the shear clutch assembly when the clutch assembly has been overloaded to a point where its shear bolt, to be described, has been sheared and the shear clutch assembly is connected for being power driven in the reverse direction to clear the overload from the feed rolls 2 and 3.

A first member, which may take the form of a plate-like flange 12 is fixed to and extends from the shaft S, the flange being fixed, for example, by means of a key 13 located in the keyway 14 of the central hole 15 that extends through the flange 12, the key 13 being engaged in the keyway 16 in the shaft, as is conventional practice. The flange has a shear bolt hole 17 extending therethrough and located generally at one side of the flange while at the opposite, diametrically opposed side of the flange is located a generally radially extending notch 20 which is also located at the end of an inclined ramp section 21 that is cut into the flange 12. The flange furthermore has an axially extending hub portion 23 on which is rotatably mounted a toothed sprocket 25, the latter constituting a second or driven member.

The sprocket 25 also has a shear bolt hole 26 which is alignable with the shear bolt hole 17 of the flange 12 when the sprocket and flange are circumferentially aligned. When the shear bolt holes 17 and 26 are in axial alignment, the shear bolt 30 can be inserted therein for forming a driving connection therebetween. In this manner, when power is transmitted through the roller chain 9 to the sprocket 25, that power is thus transmitted through the flange, the shaft S, and to the feed rolls 2 and 3.

A locking collar 32 is mounted on the shaft S and is rigidly secured for rotation therewith by means of the set screw 34 threadably engaged in the hub and having an inner end bearing in locking relationship with the shaft (FIG. 5). The locking collar 32 insures that the sprocket 25 will remain seated on the hub portion 23 of the flange 12 when the shear bolt 30 has been sheared. This arrangement results in an axially compact unit.

Means are provided for reversing the rotational direction of the drive shaft S after the shear bolt 30 has been sheared and to thereby reverse the rotation of the feed rolls so as to clear the overload crop material therefrom, and this means will now be described.

A link 40 is pivotally mounted at one end to the sprocket by the pin means 42 (FIGS. 3, 5, 7 and 9), the pin means 42 extending through the sprocket and acting as a pivot shaft for the link 40, thus permitting the link 40 to swing through a limited arc of travel. The link 40 is biased to an inner position by means of the spring 41 as at 44 and also attached at the opposite end of the spring to a bracket 45 which in turn is rigidly secured to the sprocket 25. The sprocket 25 has a slot 46 formed therein and through which extends a drive pin 50. The drive pin 50 also extends through a central portion of the link 40 and is fixed therewith by means of a nut 54 which is welded to the link 40 and in which the pin 50 is threadably engaged. A lock nut 55 is then threadably engaged on the end of the threaded pin 50 so as to hold the pin 50 in rigid engagement with the link 40.

In the normal operating condition, the shear bolt 30 extends through both the flange 17 and sprocket 25 causing the feed rolls to be driven from the gear box GB in the forward direction as indicated by the curvilinear arrow in FIG. 2. During this forward rotation, the reversing pin 50 is inoperative. The pin 50 is urged into contact with the periphery 56 of the flange 12 by means of the biasing action of the spring 41.

When an overload situation is encountered, the shear bolt 30 shears, falling away from the shear clutch assembly, as shown in FIG. 8, and with the shear bolt thus removed, the sprocket 25 rotates freely on hub 23 of the flange, thus no power is transmitted to the shaft S.

Before the drive connection can again be made for the forward driving of the feed rolls, as by inserting a new shear pin in holes 17 and 26 after the latter have been once again aligned, it is necessary to clear the feed rolls of the excessive crop material which causes the overload condition. The present invention provides a ready means for reversing the rotational direction of the drive shafts and consequently also reversing the direction of the feed rolls 2 and 3 and this is accomplished simply as follows.

The drive power to the shafts S and S1 by means of the endless chains 9 is reversed by reversing the output from the gear box and this causes the sprocket 25 which is then freely rotatable on the hub 23 of the flange 12 to be also driven in the reverse direction. As the sprocket 25 is driven in the reverse direction, the pin 50 which rotates with the sprocket rides down the ramp 21 of the flange and is engaged in the notch 20 thereof. This drive connection caused by the pin 50 thereby also causes reverse direction of rotation of the flange 12 and the drive shaft S, thereby driving the feed rolls 2 and 3 in the reverse direction and clearing the excessive crop material therefrom. It will be noted that there is no manual connection of the parts required on the part of the operator to effect reverse rotation of the drive shaft, it being only necessary for the operator to reverse the direction of power from the gear box that is transmitted by the sprocket chain 9.

As soon as the overload condition has been removed, the shear bolt hole 26 of the sprocket is aligned with the bear bolt hole 17 of the flange, thereby permitting a new shear bolt 30 to be inserted therein and this puts the assembly in condition once again for forward or normal driving operation.

We claim:

1. A shear clutch assembly comprising; a first member having a periphery and a notch formed in said periphery, a second rotatable member, said first and second members each having a hole alignable with one another, shear bolt means extending through said holes when said holes are aligned, whereby said members are rotated together in a forward direction, a drive pin shiftably mounted on said second member and for rotation therewith, said pin extending from said second member and engagable with said periphery of said first member, resilient means for biasing said pin against said periphery, whereby when said shear bolt means is removed from said holes and one of said members is driven in a reverse direction, said drive pin engages in said first member notch and said members are driven together in said reverse direction.

2. The assembly set forth in claim 1 including a link pivotted on said second member, said pin is rigidly mounted on said link for shifting movement and in respect to said second member, and said resilient means is connected between said link and said second member for urging said pin to ride on the periphery of said first member.

3. The assembly set forth in claim 2 further characterized in that said second member has a slot extending therethrough and said pin extends through said slot and laterally of said second member to engage the periphery of said first member.

4. The assembly set forth in claim 3 further characterized in that said first member has a central hub and said second member is rotatably journalled on said hub, and a locking collar adjacent said member for holding the latter captive on said hub when said shear bolt means has been removed from said members.

5. A shear clutch assembly for a rotatable power driven shaft, said assembly comprising; a first member fixed to and extending from said shaft and having a periphery and a generally C-shaped notch formed in said periphery, said first member also having an axially extending central hub, a second member rotatably mounted on said flange hub, said first member and said second member each having a hole alignable with one another, shear bolt means extending through said holes when the latter are aligned, whereby said members and shaft are rotated together in a forward direction, a drive pin shiftably mounted on said second member and for rotation therewith, said pin extending from said second member and engagable with said periphery of said first member, resilient means for biasing said pin against said periphery, whereby said shear bolt means is removed from said aligned holes and said second member is driven in a reverse direction, said drive pin engages in said notch and thereby drives said members in said reverse direction, and a locking collar rigidly but removably fixed to said shaft and adjacent said hub for holding said second member captive on said hub when said shear bolt means is removed.

6. The assembly set forth in claim 5 including a link pivotted on said second member, said pin is rigidly mounted on said link for shifting movement and in respect to said second member, and said resilient means is connected between said link and said second member for urging said pin to ride on the periphery of said first member.

7. The assembly set forth in claim 6 further characterized in that said second member has a slot extending therethrough and said pin extends through said slot and laterally of said second member to engage the periphery of said first member.

8. A machine having a pair of cooperating, power driven rolls for feeding material therethrough, a power driven shaft on said machine for driving one of said feed rolls, a shear clutch assembly for said power driven shaft, said assembly comprising; a first member fixed to and extending from said shaft and having a periphery and a notch formed in said periphery, a second member rotatably mounted on said shaft, said first and second members each having a hole alignable with one another, shear bolt means extending through said holes when the latter are aligned, whereby said members and shaft are rotated together in a forward direction, a drive pin shiftably mounted on said second member and for rotation therewith, said pin extending from said second member and engagable with said periphery of said first member, resilient means for biasing said pin against said periphery, whereby when said shear bolt means is removed from said aligned holes and said second member is driven in a reverse direction, said drive pin engages in said flange notch and thereby also drives said first member, shaft and feed roll in said reverse direction to clear an overload of material therefrom.

9. The machine set forth in claim 8 including a link pivotted on said second member, said pin is rigidly mounted on said link for shifting movement and in respect to said second member, and said resilient means is connected between said link and said second member for urging said pin to ride on the periphery of said first member.

10. The machine set forth in claim 9 further characterized in that said second member has a slot extending therethrough and said pin extends through said slot and laterally of said second member to engage the periphery of said first member.

11. The machine set forth in claim 4 further characterized in that said first member has a central hub and said second member is rotatably journalled on said hub, and a locking collar rigidly fixed to said shaft and adjacent said second member for holding the latter captive on said hub when said shear bolt means has been removed from said members.

12. A shear clutch assembly for a rotatable power driven shaft, said assembly comprising; a flange fixed to and extending from said shaft and having a periphery and a notch formed in said periphery, a member rotatably mounted on said shaft, said flange and said member each having a hole alignable with one another, shear bolt means extending through said holes when the latter are aligned, whereby said member, flange and shaft are rotated together in a forward direction, a drive pin shiftably mounted on said member and for rotation therewith, said pin extending from said member and engagable with said periphery of said flange, resilient means for biasing said pin against said periphery, whereby when said shear bolt means is removed from said holes and said member is driven in a reverse direction, said drive pin engages in said flange notch and thereby also drives said flange and shaft in said reverse direction.

13. The assembly set forth in claim 12 including a link pivotted on said member, said pin is rigidly mounted on said link for shifting movement and in respect to said member, and said resilient means is connected between said link and said member for urging said pin to ride on the periphery of said flange.

14. The assembly set forth in claim 13 further characterized in that said member has a slot extending therethrough and said pin extends through said slot and laterally of said member to engage the periphery of said flange.

15. The assembly set forth in claim 14 further characterized in that said flange has a central hub and said member is rotatably journalled on said hub, and a locking collar rigidly fixed to said shaft and adjacent said member for holding the latter captive on said hub when said shear bolt means has been removed from said flange and member.

16. A shear clutch assembly for a rotatable power driven shaft, said assembly comprising; a plate-like flange fixed to and extending from said shaft and having a periphery and a generally C-shaped notch formed in said periphery, said flange also having an axially extending central hub, a member rotatably mounted on said flange hub, said flange and said member each having a hole alignable with one another, shear bolt means extending through said holes when the latter are aligned, whereby said member, flange and shaft are rotated together in a forward direction, a drive pin shiftably mounted on said member and for rotation therewith, said pin extending from said member and engagable with said periphery of said flange, resilient means for biasing said pin against said periphery, whereby when said shear bolt means is removed from said aligned holes and said member is driven in a reverse direction, said drive pin engages in said flange notch and thereby also drives said flange and shaft in said reverse direction, and a locking collar rigidly but removably fixed to said shaft and adjacent said hub for holding said member captive on said hub when said shear bolt means is removed.

17. The assembly set forth in claim 16 including a link pivotted on said second member, said pin is rigidly mounted on said link for shifting movement and in respect to said sprocket, and said resilient means is connected between said link and said member for urging said pin to ride on the periphery of said flange.

18. The assembly set forth in claim 17 further characterized in that said member has a slot extending therethrough and said pin extends through said slot and laterally of said member to engage the periphery of said flange.

19. A machine having a pair of cooperating, power driven rolls for feeding material therethrough, a power driven shaft on said machine for driving one of said feed rolls, a shear clutch assembly for said power driven shaft, said assembly comprising; a flange fixed to and extending from said shaft and having a periphery and a notch formed in said periphery, a member rotatably mounted on said shaft, said flange and said member each having a hole alignable with one another, shear bolt means extending through said holes when the latter are aligned, whereby said member, flange and shaft are rotated together in a forward direction, a drive pin shiftably mounted on said member and for rotation therewith, said pin extending from said member and engagable with said periphery of said flange, resilient means for biasing said pin against said periphery, whereby when said shear bolt means is removed from said aligned holes and said member is driven in a reverse direction, said drive pin engages in said flange notch and thereby also drives said flange, shaft and feed roll in said reverse direction to clear an overload of material therefrom.

20. The machine set forth in claim 19 including a link pivoted on said member, said pin is rigidly mounted on said link for shifting movement and in respect to said member, and said resilient means is connected between said link and said member for urging said pin to rid on the periphery of said flange.

21. The machine set forth in claim 20 further characterized in that said member has a slot extending therethrough and said pin extends through said slot and laterally of said member to engage the periphery of said flange.

22. The machine set forth in claim 21 further characterized in that said flange has a central hub and said member is rotatably journalled on said hub, and a locking collar rigidly fixed to said shaft and adjacent said member for holding the latter captive on said hub when said shear bolt means has been removed from said flange and member.

* * * * *